United States Patent [19]

Kreis

[11] Patent Number: 5,609,004
[45] Date of Patent: Mar. 11, 1997

[54] END PART FOR A VEHICLE LONGITUDINAL BEAM

[75] Inventor: Gundolf Kreis, Oberstimm, Germany

[73] Assignee: Audi, AG, Ingolstadt, Germany

[21] Appl. No.: 408,320

[22] Filed: Mar. 22, 1995

[30] Foreign Application Priority Data

Oct. 23, 1992 [DE] Germany .......................... 42 35 738.1

[51] Int. Cl.$^6$ ........................................................ F16B 7/04
[52] U.S. Cl. ........................... 52/655.1; 403/231; 296/29; 296/193; 296/203
[58] Field of Search ............................... 52/737.2, 656.9, 52/655.1; 403/13, 231, 292, 295; 296/29, 30, 187, 193, 194, 195, 196, 197, 203, 204, 205, 209

[56] References Cited

U.S. PATENT DOCUMENTS

| | | | |
|---|---|---|---|
| 4,988,230 | 1/1991 | Banthia et al. | 403/170 |
| 5,059,056 | 10/1991 | Banthia et al. | 403/231 X |
| 5,271,687 | 12/1993 | Holka et al. | 296/203 X |

FOREIGN PATENT DOCUMENTS

| | | |
|---|---|---|
| 0146716 | 7/1985 | European Pat. Off. . |
| 0461346 | 12/1991 | European Pat. Off. . |
| 4204826 | 6/1993 | Germany . |
| 04066374 | 3/1992 | Japan . |
| 2169375 | 7/1986 | United Kingdom . |

OTHER PUBLICATIONS

Aluminium, "Aluminium und Kunststoff Im Verbundein Schritt Zur Leichteren Auto Karosserie", vol. 64, No. 9 (1988).

*Primary Examiner*—Carl D. Friedman
*Assistant Examiner*—Yvonne Horton-Richardson
*Attorney, Agent, or Firm*—Thomas C. Feix

[57] ABSTRACT

An end part for a vehicle longitudinal beam consisting of a longitudinal bearer member designed as a hollow section longitudinal beam (1) and an end part (3) which is partially inserted within and secured to one end of the hollow section longitudinal beam. The end part is formed as an extruded hollow section which includes a ring-shaped closed outer wall (5) having at least one integrally formed fastening element for fastening other parts thereto. The outer contour or profile (6) of the end part (3) corresponds to the inner contour or profile (2) of the hollow section longitudinal beam (1) in order to provide a tight interlocking fit between the mutually contacting surfaces of the two parts. The longitudinal axis of the end part (3) and the longitudinal axis (4) of the hollow section longitudinal beam (1) are coaligned with one another so that the end part (3) is capable of ensuring a form-fitted stable union with the hollow section longitudinal beam (1) even when the cross section of the hollow section longitudinal beam (1) has a complex shape. In addition, the male and female fastening elements which are shaped during the extrusion process lie in the longitudinal direction of the hollow section longitudinal beam and are thus appropriately oriented for a large number of applications.

11 Claims, 1 Drawing Sheet

END PART FOR A VEHICLE LONGITUDINAL BEAM

BACKGROUND OF THE INVENTION

1. Field of the Invention

The present invention relates to improvements in vehicle bodywork construction. More particularly, the invention relates to an extruded light metal end part for connection to an open end of a hollow section, light metal longitudinal beam of a vehicle bodywork, wherein the end part includes integrally formed fastening elements for attaching additional components thereto, and wherein the fastening elements are oriented along both the transverse and longitudinal directions of the longitudinal beam.

2. Brief Description of the Prior Art

Longitudinal beams and transverse beams are used in the supporting structure of a motor vehicle body, especially in the substructure. With the self-supporting bodies commonly used today, these beams are hollow sections that are made of at least two deep-drawn plates of metal that are welded together.

The front and rear ends of each longitudinal beam are provided with an end part which allows other components to be secured to the longitudinal beam. Such end parts are also formed as deep-drawn parts made of plate steel that are welded to the longitudinal beam part. An air scoop, a radiator, a headlight, a towing hitch and a bumper mount are among the additional components that attach to the front end of a longitudinal beam.

Steel plate shaped by a conventional deep drawing process is used to form such self-supporting steel plate automotive bodies. While the compression molding dies for shaping the plate metal are relatively expensive, they do permit a high production output, so this is an inexpensive solution for mass production.

In the case for mass production on a small scale, it is known from European Patent No.: 0.146,716B1 how to produce motor vehicle bodies for passenger vehicles which have a supporting structure made of hollow sections that are joined together by junction elements. The hollow sections are designed as extruded light metal sections (ie, aluminum alloy) and the junction elements are formed as light metal castings.

In addition to providing an inexpensive solution for smaller series production runs, such a design also yields the advantages of lower body weight and better protection against corrosion. The front end part for the automotive longitudinal beam disclosed in this patent document is designed in the manner of a junction element as a lightweight metal casting with integrated fasteners. Such a light metal casting, however, is relatively expensive due to the way it is produced and the relatively large amount of material that is required.

In accordance with another known automotive body made of extruded lightweight metal sections (*Aluminum Journal*, published by Aluminum-Zentrale e.V., Düsseldorf, also printed in the journal Aluminum, vol. 64, no. ,9(1988)), the respective front ends of two parallel, spaced apart longitudinal beams are joined together by a transverse beam that is butt-welded in place. This published document does not teach or suggest how to attach extra parts to the longitudinal beams.

A generic end part for an automotive longitudinal beam is also disclosed in U.S. Pat. No. 4,988,230. This part document shows a longitudinal beam part that is designed as a hollow section beam and an end part that is inserted within the one end of the longitudinal beam part. The end part further includes at least one fastening element for fastening other parts. The end part is formed as an extruded section with a closed, ring-shaped outer wall.

In this example, the longitudinal axis of the end part and the longitudinal axis of the longitudinal beam part are at right angles to each other, and the length of the section of the end part corresponds to the inside diameter of the longitudinal beam part. The two opposing cut faces of the end part are in one plane and are parallel to each other. In order to achieve a form-fitting contact with the plug-in connection, the inside contour of the longitudinal beam part must be designed with two parallel flat surfaces. Thus the cross-sectional contour of the longitudinal beam hollow section cannot be designed with just any dimensions in the end area, but instead the cross sectional contour is determined essentially by the cut surfaces of the end part.

This is especially unfortunate in the case where the longitudinal beam is formed as an extruded light metal section since an extruded light metal section has a constant cross-sectional contour over its entire length due to the limitations in the extrusion process. Accordingly, for such a case, the design emphasis of the extruded light metal beam is based on the geometry of the insertable end part, rather than the more important design criteria of rigidity, deformational properties, and the impact energy absorption capability of the longitudinal beam.

Since the end part in the above example is also manufactured as an extruded section, the shape of the integrated fastening elements in the longitudinal direction is given. The bolt holes on these integrated fastening elements, especially for screw connections, therefore run in a transverse plane of the motor vehicle when used on a longitudinal beam with the known arrangement. However, other parts which are bolted onto the end of longitudinal beams, such as bumpers, use bolt fasteners which have a tightening direction that is in the longitudinal direction of the motor vehicle. Accordingly, it would be desirable to provide an extruded section end part which would permit the attachment of additional parts or components irrespective of the tightening direction of the associated fasteners.

Published Japanese Patent Document Number 4-66374A (published in: *Patent Abstracts of Japan*, sect. M, vol. 16 (1992), no. 270(M-1266)) discloses a known end part design for a longitudinal beam in a motor vehicle body wherein the longitudinal axis of an end part is coaligned with the longitudinal axis of the longitudinal beam onto which the end part is connected.

This document, however, does not disclose any fastening elements mounted on the end part which allow other parts to be secured thereto, nor does this document teach or suggest to form an insertion-type connection over the entire cross section of the longitudinal beam.

Accordingly, the problem on which the present invention is based is to improve the design of a generic end part for a hollow section automotive longitudinal beam to the extent that greater freedom is allowed with regard to the design and dimensions of the hollow section longitudinal beam while still achieving an inexpensive and stable design for the end part.

SUMMARY OF THE INVENTION

It is an object of the present invention to provide an insertable plug-in type end part for a hollow section longitudinal beam of a vehicle bodywork, wherein the end part is formed as a light metal extruded section and includes integral fastening elements which permit the attachment of parts or components thereto irrespective of the tightening direction of the associated fasteners.

It is another object of the invention to provide an end part of the type described which is of low cost and is simple in design.

In accordance with the present invention, the end part is formed as a hollow section and has an outside contour or profile which corresponds to the inside contour or profile of an open end of a hollow section longitudinal beam. In use, the hollow section longitudinal beam and the end part are locked together in form-fitting manner with their respective mutually opposing surfaces disposed contacting one another and their respective longitudinal axis arranged in coalignment with each other.

Consequently, the end part is suitable for a form-fitting and stable contact joint. The end part is provided with integrated fastening elements which are produced by the extrusion process. The integrated fastening elements are preferably arranged in the longitudinal direction of the longitudinal beam part and are thus aligned in a suitable manner for most of the cases where parts are added onto the beam.

In accordance with one advantageous feature of the invention, at least one strip (continuous in the longitudinal direction of the section) is provided as a fastening element on the outside contour of the end part. This strip is available as a mounting flange and/or as a nut holder for attaching add-on parts. Such mounting flanges can be provided with a bore hole for receiving bolt fasteners or with a threaded hole for receiving screw fasteners. The mounting flange may also be designed as a C section for the case when it is to be used as a nut holder.

The end part may also be provided with additional integrally formed fastening structure in the form of longitudinally oriented hollow cylindrical sections disposed along the outside contour of the end part. The interior surfaces of the hollow cylindrical sections may be cut with threads in order to provide a screw holes to permit attachment of parts, such as bumpers, which are secured with fasteners that have a tightening direction in the longitudinal direction of the vehicle bodywork. The strips, flanges and hollow cylindrical sections are produced by extrusion and thus are inexpensive to manufacture and are available without any additional parts or measures.

Since the integrated fastening elements disposed on the outer contour of the end part will hinder the insertion of the end part within the open end of the hollow section longitudinal beam, the invention proposes that these integrated fastening elements be notched along their base end on the side of the end part which faces toward the open end of the hollow section longitudinal beam (ie, the insertion end). In this way, the end part can be fitted within the open end of the hollow section longitudinal beam such that the respective notched regions of the integrated fastening elements overlap the open end of the hollow section longitudinal beam to provide for a good form-fitting connection.

According to another advantageous feature of the invention, at least one of the longitudinally oriented integrally formed hollow cylinders may be provided as another fastening element within the hollow interior portion of the end part, especially to accommodate a screw connection. These interiorly disposed hollow cylinders also serve to reinforce and stabilize the hollow section end part.

In addition, the hollow section end part may be provided with reinforcing walls that run in the longitudinal direction of the hollow section and may optionally contain and connect the interiorly disposed hollow cylinders.

The end part of the present invention can be used to particular advantage in an automotive bodywork assembled from bearer members in the form of extruded light metal hollow sections that are joined together by node or junction elements in the form of light metal castings. Both the longitudinal beam o part and the end part preferably comprise a light weight metal, such as for example, an aluminum alloy.

In accordance with another advantageous aspect of the invention, many conventional joining techniques may be used for securing the end part to the hollow section longitudinal beam. Especially suitable joining techniques include welding, gluing, riveting, and/or use of bolt and screw fasteners.

These and other objects and advantages of the present invention will no doubt become apparent to those skilled in the art from the following drawing, detailed description of the preferred embodiment and the appended claims.

IN THE DRAWING

FIG. 1 is an isometric perspective view of an end part of the present invention as shown fitted within an open end of a hollow section longitudinal beam of a vehicle bodywork (shown in phantom).

DESCRIPTION OF THE PREFERRED EMBODIMENT

Figure 1:
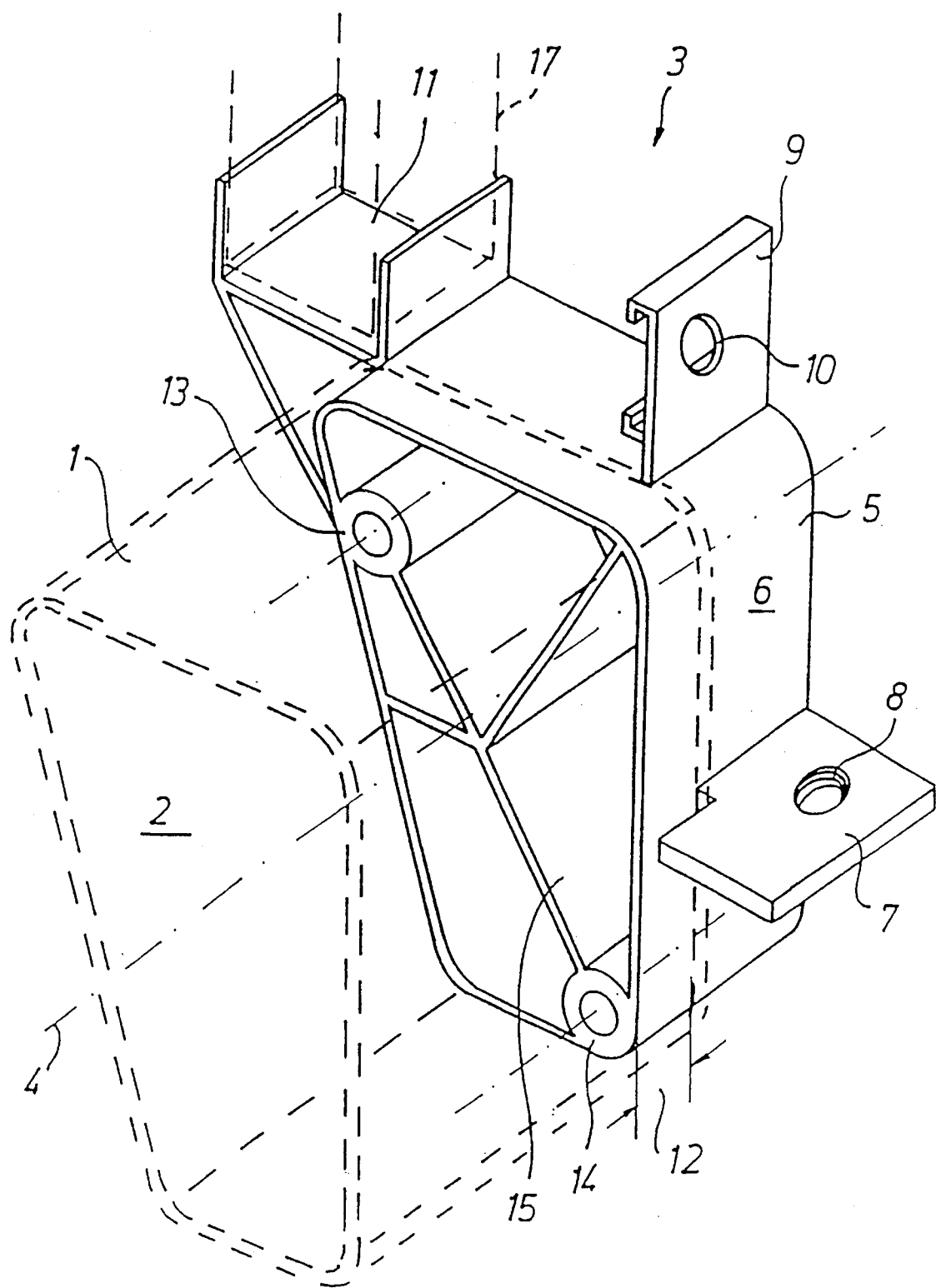

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 shows (in phantom) the front end of an automotive longitudinal beam 1. This longitudinal beam 1 is a hollow section that is manufactured as an extruded section using an aluminum alloy. The hollow section of the longitudinal beam pat 1 has an inside contour 2 that is free of inside parts (at least in the area of the front end).

In addition, FIG. 1 also shows an end part 3 that is connected to the front end of the longitudinal beam 1. The end part 3 is formed as a light metal extruded section, preferably made of an aluminum alloy. The end part 3 is fitted within the open end of the longitudinal beam 1 such that the longitudinal axis of the end part 3 is coaligned with the longitudinal axis of the longitudinal beam 1. The end part 3 is designed as a hollow section with a closed, ring-shaped outside wall 5 having an outside contour 6 which corresponds to the inside contour 2 of the longitudinal beam part 1.

The end part 3 is advantageously provided with several types of integrally formed fastening elements for attaching additional parts or components to the outside contour 6 of the end part 3. For example, a mounting flange 7 having a threaded bore hole 8 is provided as one type of fastening element to the outside contour 6 of the end part 3. A second type of fastening element in the form of a C section flange 9 with a bore hole 10 is provided as a nut holder. A third type of fastening element includes bracket 11 for connecting another extruded section 17 (indicated with dotted lines) or for connecting a towing hitch to the outside contour 6 of the end part 3.

The above described fastening elements 7, 9 and 11 are each notched or set back by a distance 12 on the end face of the end part 3 which faces the open end of longitudinal beam 1.

The end part 3 is inserted within the open end of longitudinal beam 1 up to the limit of the notch or set back distance 12 in a form-fitting manner to provide a tight fit connection. The joint is secured in place by welding or gluing the mutual contact surfaces of the end part 3 and the longitudinal beam 1 together. Alternatively, the resulting joint may be finally secured by use of other conventional types of fasteners or connection means including, but not limited to, rivets, screw fasteners, and/or bolt fasteners.

In addition to the above described externally disposed integrally formed fastening elements, 7, 9, and 11, the end part 3 may further include one ore more integrally formed longitudinally oriented hollow cylinders 13 and 14. The interior hollow portions of the cylinders 13 and 14 may be cut with a thread such that the cylinders can be used as mounting eyes for receiving engaging screw fasteners which have a tightening direction in the longitudinal direction of the vehicle bodywork. As such, the cylinders 13 and 14 are ideally suited for receiving a bumper mount. While not shown, the hollow cylinders may also be provided to the outer contour 6 of the end part 3.

The end part 3 may further include integrally formed reinforcing walls 15 which also run in the longitudinal direction and also connect and support the hollow cylinders 13 and 14. The reinforcing walls 15 are preferably arranged in a star pattern inside the outside wall 5 of the end part 3 for maximum support.

As is readily apparent from the preceding description, the present invention creates an inexpensive end part for an automotive longitudinal beam that is easy to assemble and is very suitable for mounting other parts, irrespective of whether such parts use fasteners which have a tightening direction in the longitudinal or transverse direction of the vehicle bodywork.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

What is claimed is:

1. An end part for connection to an open end of a hollow section longitudinal beam of a vehicle bodywork, the hollow section longitudinal beam having a longitudinal axis, the end part comprising:
   a) an extruded section having a first end, a second end, a longitudinal axis, and a longitudinal length disposed between said first end and said second end and defining a closed, ring-shaped outer wall separating said first end from said second end, and wherein:
      i) said longitudinal axis of said extruded section is substantially parallel to an extrusion direction of said extruded section,
      ii) said ring-shaped outer wall having an outer contour configured to conformingly match an inner wall contour of the hollow section longitudinal beam to provide form fitting mating contact between said outer contour and the inner wall contour as said first end of said extruded section is inserted within the open end of the hollow section longitudinal beam with the longitudinal axis of said extruded section aligned with the longitudinal axis of the hollow section longitudinal beam;
   b) at least one flange structure integrally formed along said outer contour of said ring-shaped outer wall and oriented substantially parallel to the longitudinal axis of said extruded section, wherein:
      i) said flange structure has a leading edge disposed at a distance inward from said first end of said extruded section corresponding to a predetermined insertion depth of said first end of said extruded section within the open end of the hollow section longitudinal beam;
      ii) said flange structure extends across a longitudinal length of said ring-shaped outer wall of said extruded section: p2 iii) said flange structure includes a notch at a base end thereof adjacent said first end of said extruded section, said notch having a depth corresponding to said insertion depth and a height sufficient to receive a wall thickness of the open end of the hollow section longitudinal beam;
      iv) said flange structure includes mounting means for detachably mounting other components to said extruded section; and
   c) connecting means for connecting said extruded section to the open end of the hollow section longitudinal beam.

2. The invention of claim 1 wherein:
   a) said extruded section includes at least one longitudinally oriented hollow cylinder formed integral with an interior wall of said extruded section; and
   b) said hollow cylinder having an inner wall which is threaded to accommodate a screw fastener therein.

3. The invention of claim 1 wherein said extruded section further includes a plurality of interiorly disposed reinforcing walls which extend in a longitudinal direction of said extruded section.

4. The invention of claim 2 wherein said extruded section further includes a plurality of interiorly disposed reinforcing walls which extend in a longitudinal directions of said extruded section.

5. The invention of claim 1 wherein said hollow section longitudinal beam and said extruded section are composed of aluminum.

6. The invention of claim 2 wherein said hollow section longitudinal beam and said extruded section are composed of aluminum.

7. The invention of claim 3 wherein said hollow section longitudinal beam and said extruded section are composed of aluminum.

8. The invention of claim 1 wherein said connecting means is selected from the group consisting of:
   a) welding;
   b) adhesives;
   c) screw fasteners; and
   e) rivets.

9. The invention of claim 2 wherein said connecting means is selected from the group consisting of:
   a) welding;
   b) adhesives;
   c) screw fasteners;
   d) bolt fasteners; and
   e) rivets.

10. The invention of claim 3 wherein said connecting means is selected from the group consisting of:

a) welding;
b) adhesives;
c) screw fasteners;
d) bolt fasteners; and
e) rivets.

11. The invention of claim 5 wherein said connecting means is selected from the group consisting of:

a) welding;
b) adhesives;
c) screw fasteners;
d) bolt fasteners; and
e) rivets.

* * * * *